(12) United States Patent
Nordeen et al.

(10) Patent No.: US 8,967,945 B2
(45) Date of Patent: Mar. 3, 2015

(54) INDIVIDUAL INLET GUIDE VANE CONTROL FOR TIP TURBINE ENGINE

(71) Applicant: United Technologies Corporation, Hartford, CT (US)

(72) Inventors: Craig A. Nordeen, Manchester, CT (US); James W. Norris, Lebanon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/138,889

(22) Filed: Dec. 23, 2013

(65) Prior Publication Data
US 2014/0219772 A1 Aug. 7, 2014

Related U.S. Application Data

(62) Division of application No. 11/719,868, filed on May 22, 2007, now Pat. No. 8,641,367.

(51) Int. Cl.
*F01D 17/16* (2006.01)
*F01D 9/06* (2006.01)

(52) U.S. Cl.
CPC ............. *F01D 17/16* (2013.01); *Y10S 415/914* (2013.01)
USPC ............... 415/1; 415/155; 415/160; 415/162; 415/914

(58) Field of Classification Search
USPC ............. 415/1, 115–117, 155, 159–162, 914; 60/226.1, 39.23
See application file for complete search history.

(56) References Cited

U.S. PATENT DOCUMENTS

| 1,544,318 | A | 6/1925 | Hodgkinson |
| 2,221,685 | A | 11/1940 | Smith |
| 2,414,410 | A | 1/1947 | Griffith |
| 2,499,831 | A | 3/1950 | Palmatier |
| 2,548,975 | A | 4/1951 | Hawthorne |
| 2,611,241 | A | 9/1952 | Schulz |
| 2,620,554 | A | 12/1952 | Mochel et al. |
| 2,698,711 | A | 1/1955 | Newcomb |
| 2,801,789 | A | 8/1957 | Moss |

(Continued)

FOREIGN PATENT DOCUMENTS

| DE | 2451059 | 4/1976 |
| DE | 19646601 | 4/1997 |

(Continued)

OTHER PUBLICATIONS

PCT International Search Report for PCT/US2004/039974 date of completion Feb. 16, 2006.

*Primary Examiner* — Christopher Verdier
(74) *Attorney, Agent, or Firm* — Carlson, Gaskey & Olds, P.C.

(57) ABSTRACT

A tip turbine engine according to the present invention includes a plurality of independently variable inlet guide vanes for the fan and/or for the compressor. An actuator is operatively coupled to each of the flaps, such that each actuator can selectively vary the flap of its associated inlet guide vane. In one embodiment, the inlet guide vanes each include a pivotably mounted flap that is variable independently of the flaps of at least some of the other inlet guide vanes. In another embodiment, the inlet guide vanes each include at least one fluid outlet or nozzle directing pressurized air, as controlled by the associated actuator, to control inlet distortion.

8 Claims, 3 Drawing Sheets

(56) References Cited

U.S. PATENT DOCUMENTS

| | | | |
|---|---|---|---|
| 2,830,754 A | 4/1958 | Stalker | |
| 2,874,926 A | 2/1959 | Gaubatz | |
| 2,989,848 A | 6/1961 | Paiement | |
| 3,009,630 A | 11/1961 | Busquet | |
| 3,037,742 A | 6/1962 | Dent et al. | |
| 3,042,349 A | 7/1962 | Pirtle et al. | |
| 3,081,597 A | 3/1963 | Kosin et al. | |
| 3,132,842 A | 5/1964 | Tharp | |
| 3,204,401 A | 9/1965 | Serriades | |
| 3,216,455 A | 11/1965 | Cornell et al. | |
| 3,267,667 A | 8/1966 | Erwin | |
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,043,121 A | 8/1977 | Thomas et al. | |
| 4,130,379 A | 12/1978 | Partington | |
| 4,147,035 A | 4/1979 | Moore et al. | |
| 4,193,738 A | 3/1980 | Landis, Jr. et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,314,791 A | 2/1982 | Weiler | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,472,314 A | 12/1995 | Delonge et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Lifson et al. | |
| 6,254,346 B1 | 7/2001 | Fukuno et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 7,854,112 B2 | 12/2010 | Roberge | |
| 7,934,902 B2 | 5/2011 | Suciu et al. | |
| 7,976,272 B2 | 7/2011 | Suciu et al. | |
| 7,980,054 B2 | 7/2011 | Suciu et al. | |
| 8,276,362 B2 | 10/2012 | Suciu et al. | |
| 8,641,367 B2 * | 2/2014 | Norris et al. | 415/115 |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0161724 A1 | 8/2003 | Capozzi et al. | |
| 2003/0192303 A1 | 10/2003 | Paul | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |
| 2009/0145105 A1 | 6/2009 | Suciu et al. | |
| 2009/0148273 A1 | 6/2009 | Suciu et al. | |
| 2009/0232643 A1 | 9/2009 | Norris et al. | |

FOREIGN PATENT DOCUMENTS

| | | |
|---|---|---|
| FR | 2599086 | 11/1987 |
| GB | 907323 | 10/1962 |
| GB | 1287223 | 8/1972 |
| GB | 1351000 | 4/1974 |
| GB | 1357016 | 6/1974 |
| GB | 1466613 | 3/1977 |
| GB | 2016597 | 9/1979 |
| GB | 2026102 | 1/1980 |
| GB | 2095755 | 10/1982 |
| GB | 2191606 | 12/1987 |
| GB | 2265221 | 9/1993 |
| GB | 2410530 | 8/2005 |
| JP | 10184305 | 7/1998 |
| WO | 02081883 | 10/2002 |
| WO | 2004092567 | 10/2004 |

* cited by examiner

INDIVIDUAL INLET GUIDE VANE CONTROL FOR TIP TURBINE ENGINE

CROSS REFERENCE TO RELATED APPLICATIONS

This is a divisional application of U.S. patent application Ser. No. 11/719,868 dated May 22, 2007, now U.S. Pat. No. 8,641,397.

BACKGROUND OF THE INVENTION

The present invention relates to turbine engines, and more particularly to individually controlled inlet guide vanes for a tip turbine engine.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the hollow fan blades operate as a high pressure centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In some applications, there may be a significant component of the airflow that is normal to the inlet to the turbine engine. This normal component may cause distortion of the airflow and cause stability problems. This would be particularly true where the turbine engine is mounted vertically in the aircraft and another engine provides forward thrust. The aircraft would often be moving in a direction normal to the inlet to the vertically-oriented turbine engine. It should be noted that even engines that are not completely vertical may also have a significant component of the airflow that is normal to the turbine engine axis.

SUMMARY OF THE INVENTION

A tip turbine engine according to the present invention includes a plurality of independently variable inlet guide vanes for the fan and/or for the compressor. An actuator is operatively coupled to each of the flaps, such that each actuator can selectively vary the flap of its associated inlet guide vane. In one embodiment, the inlet guide vanes each include a pivotably mounted flap that is variable independently of the flaps of at least some of the other inlet guide vanes. In another embodiment, the inlet guide vanes each include at least one fluid outlet or nozzle directing pressurized air, as controlled by the associated actuator, to control inlet distortion.

With independent control of the variable inlet guide vanes, distortion at the inlet to the bypass fan and/or the inlet to the compressor is reduced, thereby improving the stability of the turbine engine. The independently variable inlet guide vanes can be used in tip turbine engines and other turbine engines. Although potentially useful for horizontal installations as well, this feature is particularly suited for non-horizontal installations, especially vertical installations, where there is a substantial airflow component normal to the inlet to the turbine engine.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
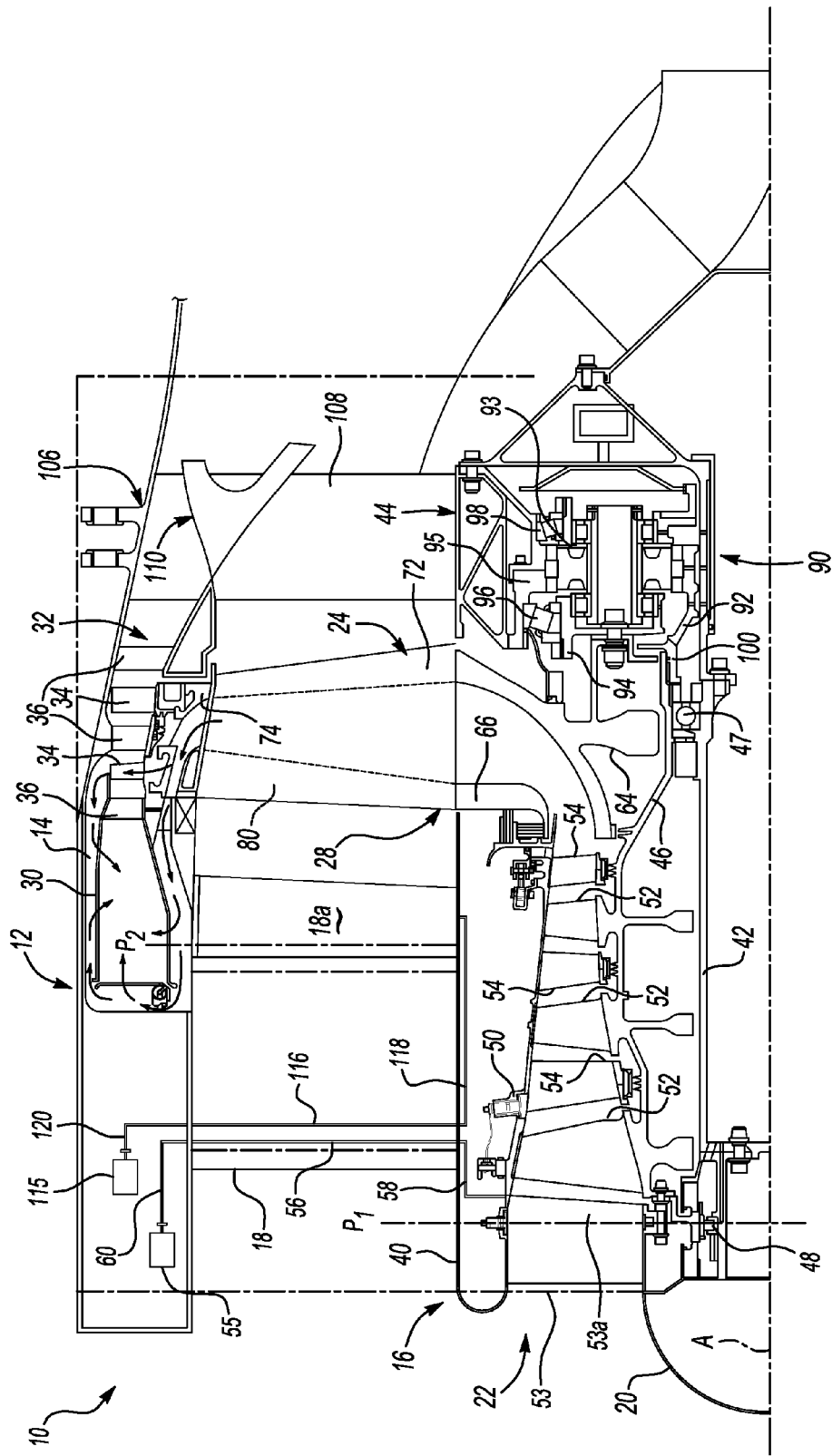
FIG. 1 is a longitudinal sectional view along an engine centerline of a tip turbine according to the present invention.

FIG. 1 is a partial sectional view of a tip turbine engine (TTE) type gas turbine engine 10 taken along an engine centerline A. Although the turbine engine 10 is shown horizontally, the turbine engine 10 could be mounted at any orientation, and as explained above, vertical orientations would experience particular benefits from the present invention. The turbine engine 10 includes an outer housing 12, a rotationally fixed static outer support structure 14 and a rotationally fixed static inner support structure 16. A plurality of fan inlet guide vanes 18 are mounted between the static outer support structure 14 and the static inner support structure 16. Each fan inlet guide vane 18 includes a variable flap 18A.

A nosecone 20 may be located along the engine centerline A to improve airflow into an axial compressor 22, which is mounted about the engine centerline A behind the nosecone 20. The nosecone 20 might not be used in vertical installations.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and communicates with the turbine 32. The rotationally fixed static inner support structure 16 includes a splitter 40, a static inner support housing 42 and a static outer support housing 44 located coaxial to said engine centerline A.

The axial compressor 22 includes an axial compressor rotor 46, which is mounted for rotation upon the static inner support housing 42 through an aft bearing assembly 47 and a forward bearing assembly 48. A plurality of stages of compressor blades 52 extend radially outwardly from the axial compressor rotor 46. A fixed compressor case 50 is mounted within the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example).

A plurality of independently variable compressor inlet guide vanes 53 having pivotably mounted flaps 53A are positioned at the inlet to the axial compressor 22. Each compressor inlet guide vane includes a variable flap 53A. The flap 53A of each compressor inlet guide vane 53 is variable, i.e. it is selectively pivotable about an axis P1 that is transverse to the engine centerline. Additionally, the flap 53A of each compressor inlet guide vane 53 is pivotable independently of the flaps 53A of the other inlet guide vanes 53 or is pivotable in groups of two or more such that every flap in a group rotates together the same amount.

The rotational position of the flap 53A of each compressor inlet guide vane 53 is controlled by an independent actuator 55. The actuators 55 may be hydraulic, electric motors or any other type of suitable actuator. In the embodiment shown, the actuator 55 is located within the housing 12, radially outward of the bypass airflow path. Each actuator 55 is operatively connected to a corresponding flap 53A of an inlet guide vane via linkage, including a torque rod 56 that is routed through one of the inlet guide vanes 53. Within the splitter 40, the torque rod 56 is coupled to a trailing edge of the flap 53A via a torque rod lever 58. Within the housing 12, the actuator 55 is connected to the torque rod 56 via an actuator lever 60. Alternatively, the actuators may be directly mounted to the inner or outer end of the flap thus eliminating the linkages and torque rods.

A plurality of independently variable fan inlet guide vanes 18 having pivotably mounted flaps 18A are positioned in front of the fan blades 28. Each fan inlet guide vane 18 extends between the between the static outer support structure 14 and the static inner support structure 16 and includes a variable flap 18A. The flap 18A of each fan inlet guide vane 18 is variable, i.e. it is selectively pivotable about an axis P2 that is transverse to the engine centerline. Additionally, the flap 18A of each fan inlet guide vane 18 is pivotable independently of the flaps 18A of the other fan inlet guide vanes 18.

The rotational position of the flap 18A of each inlet guide vane is controlled by an independent actuator 115. The actuators 115 may be hydraulic, electric motors or any other type of suitable actuator. In the embodiment shown, the actuator 115 is located within the housing 12, radially outward of the bypass airflow path. Each actuator 115 is operatively connected to its corresponding flap 18A of an inlet guide vane via linkage, including a torque rod 116 that is routed through one of the fan inlet guide vanes 18. Within the splitter 40, the torque rod 116 is coupled to an outer end of the flap 18A via a torque rod lever 118. Within the housing 12, the actuator 115 is connected to the torque rod 116 via an actuator lever 120.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is diffused and turned once again toward an axial airflow direction toward the annular combustor 30. Preferably, the airflow is diffused axially forward in the turbine engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 may be an epicyclic gearbox, such as a planetary gearbox as shown, that is mounted for rotation between the static inner support housing 42 and the static outer support housing 44. The gearbox assembly 90 includes a sun gear 92, which rotates the axial compressor 22, and a planet carrier 94, which rotates with the fan-turbine rotor assembly 24. A plurality of planet gears 93 each engage the sun gear 92 and a rotationally fixed ring gear 95. The planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/ or may provide a decrease in rotation speed.

Figure 2:
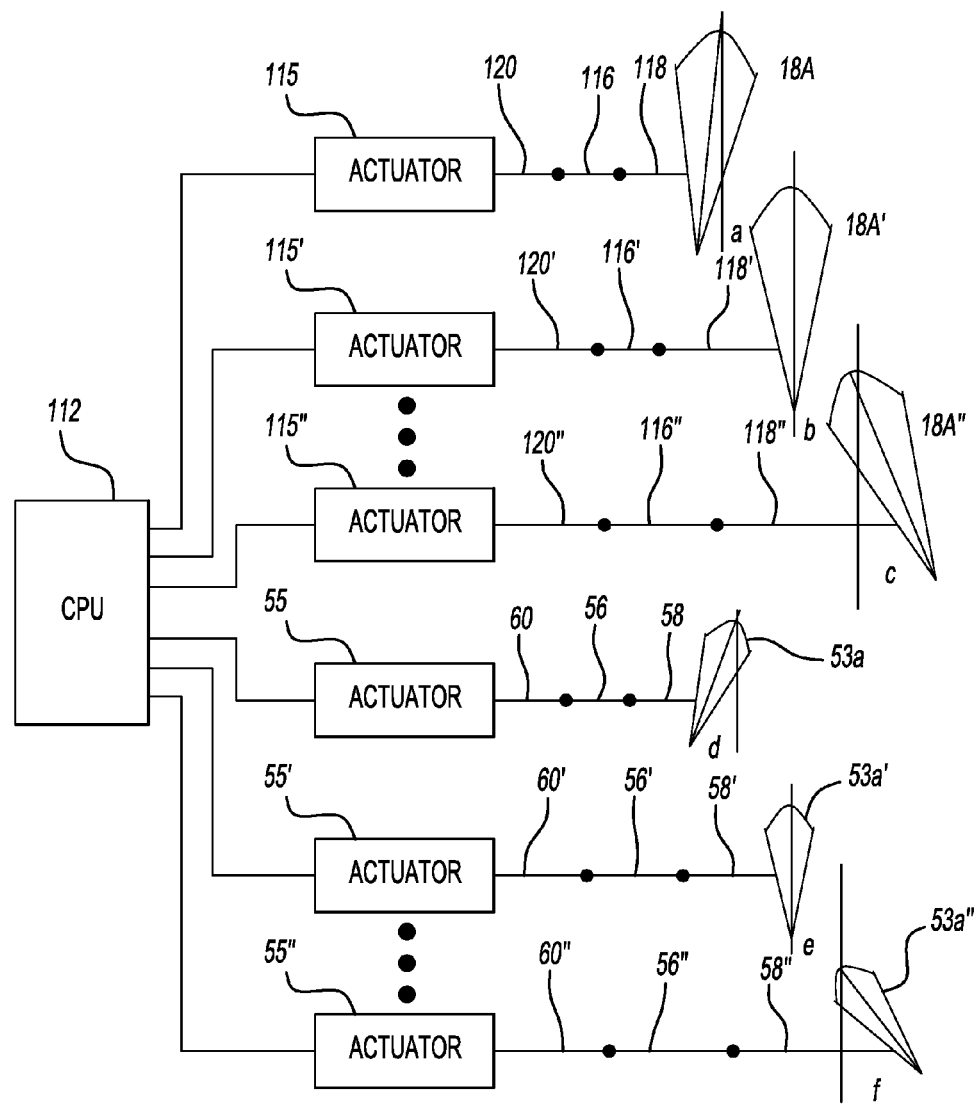
FIG. 2 schematically illustrates three of the fan inlet guide vanes and three of the compressor inlet guide vanes of the tip turbine engine of FIG. 1.

FIG. 2 is a schematic of three of the fan inlet guide vane flaps 18A, 18A', 18A" and three of the compressor inlet guide vane flaps 53A, 53A', 53A". The rotational position of the flap 18A, 18A', 18A" of each fan inlet guide vane 18, 18', 18" is controlled by an independent actuator 115, 115', 115", respectively. As is shown in FIG. 2, the torque rod 116, 116', 116" is connected to the flap 18A, 18A', 18A" via torque rod lever 118, 118', 118". The linkage is shown schematically in FIG. 2, but various configurations could be utilized. The actuators 115, 115', 115" are independently controlled by a controller or CPU 112 to selectively pivot the flaps 18A, 18A', 18A" to desired positions independently. For example, in FIG. 2, as controlled by the CPU 112, the first flap 18A is pivoted by actuator 115 to an angle a relative to a plane extending radially through the first flap 18A and the engine centerline A, while the second flap 18A' is pivoted by actuator 115' to an angle b relative to a plane through the second flap 18A' and the engine centerline A and while the third flap 18A" is pivoted by actuator 115" to an angle c relative to a plane through the third flap 18A" and the engine centerline A. Each of the angles a, b and c is varied independently of the others and can be set to different angles.

Similarly, the rotational position of the flap 53A, 53A', 53A" of each compressor inlet guide vane 53, 53', 53" is controlled by an independent actuator 55, 55', 55", respectively. The actuators 55, 55', 55" are independently controlled by CPU 112 to selectively pivot the flaps 53A, 53A', 53A" to desired positions independently. For example, in FIG. 2, as controlled by the CPU 112, the first flap 53A is pivoted by actuator 55 to an angle d relative to a plane through the first flap 53A and the engine centerline A, while the second flap 53A' is pivoted by actuator 55' to an angle e relative to a plane through the second flap 53A' and the engine centerline A and while the third flap 53A" is pivoted by actuator 55" to an angle f relative to a plane through the third flap 53A" and the engine centerline A. Each of the angles d, e and f is varied independently of the others and can be set to different angles.

In operation, referring to FIG. 1, core airflow entering the axial compressor 22 is redirected by the compressor inlet guide vanes 53 and flaps 53A before being compressed by the compressor blades 52. Selective, individual, independent variation of the compressor inlet guide vane flaps 53A control inlet distortion and increase the stability of the axial compressor 22 and the turbine engine 10. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the turbine engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in an exhaust case 106. Incoming bypass airflow is redirected by fan inlet guide vanes 18 and flaps 18A before being drawn through the fan blades 28. Selective, individual, independent variation of the fan inlet guide vane flaps 18A control inlet distortion and increase the stability of the turbine engine 10.

A plurality of exit guide vanes 108 are located between the static outer support housing 44 and the rotationally fixed static outer support structure 14 to guide the combined airflow out of the turbine engine 10 and provide forward thrust. An exhaust mixer 110 mixes the airflow from the turbine blades 34 with the bypass airflow through the fan blades 28.

Figure 3:
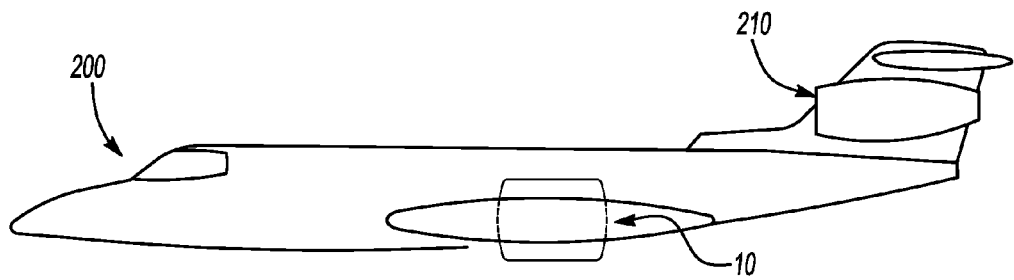
FIG. 3 schematically illustrates the tip turbine engine of FIG. 1 installed vertically in an aircraft.

FIG. 3 illustrates the turbine engine 10 of FIGS. 1-2 installed vertically in an aircraft 200. The aircraft 200 includes a conventional turbine engine 210 for primarily providing forward thrust and the turbine engine 10 for primarily providing vertical thrust. As explained above, the vertical orientation would obtain particular benefits from the individual control of the fan inlet guide vane flaps 18A and compressor inlet guide vane flaps 53A (flaps 18A and 53A are shown in FIGS. 1 and 2).

Figure 4:
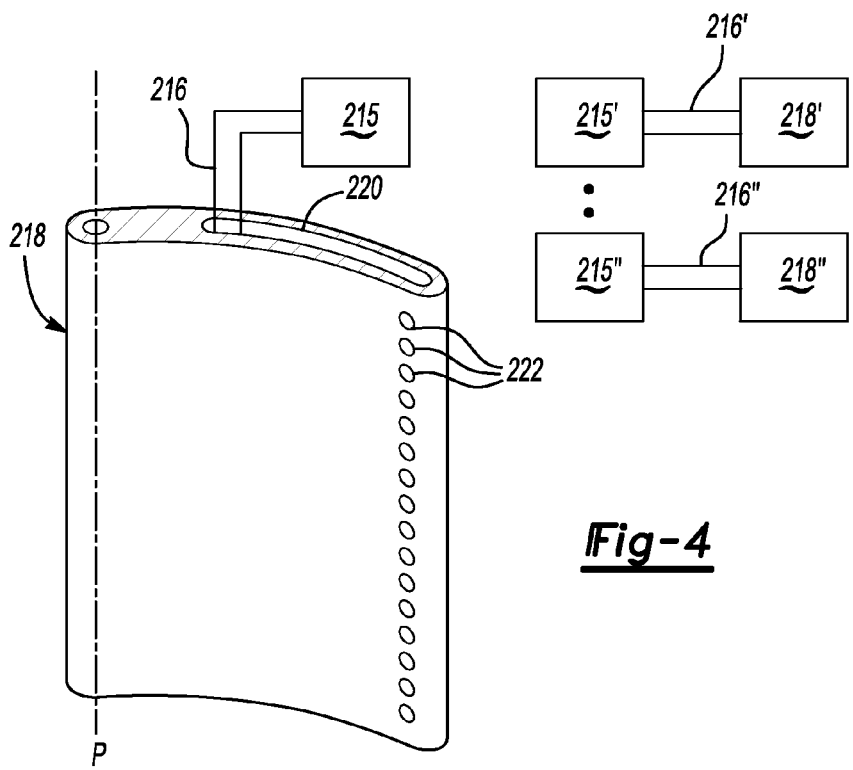
FIG. 4 illustrates an alternative variable fan inlet guide vane for the turbine engine of FIGS. 1-3.

FIG. 4 illustrates an alternative variable fan inlet guide vane 218 that could be used in the turbine engine of FIGS. 1-3. The fan inlet guide vane 218 includes an interior cavity 220 leading to a plurality of fluid outlets or nozzles 222 disposed along a trailing edge and directed transversely to the surface of the fan inlet guide vane 218. Compressed air, such as bleed air from the axial compressor 22 or from the inlet to the combustor 30 (FIG. 1), is selectively supplied to each fan inlet guide vane 218, 218', 218" independently as controlled by an associated valve actuator 215, 215', 215". In this case, the linkage between the actuator 215, 215', 215" and the variable inlet guide vane 218 is a conduit 216, 216', 216". The fluid flow through the nozzles 222 redirects the incoming airflow and reduces inlet distortion, thereby improving the stability of the turbine engine 10.

Figure 5:
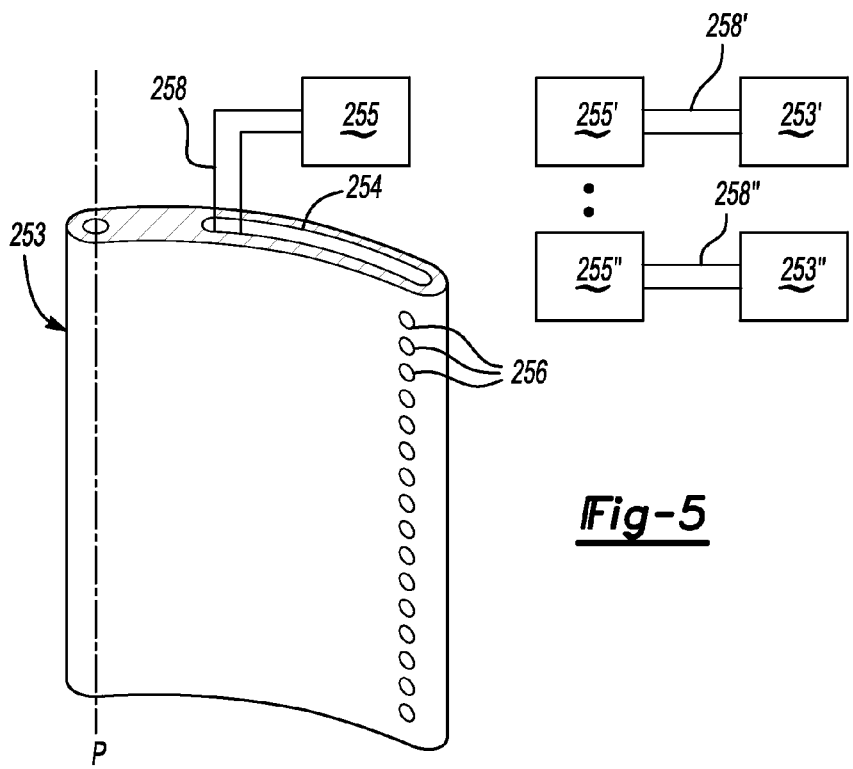
FIG. 5 illustrates an alternative variable compressor inlet guide vane for the turbine engine of FIGS. 1-3.

Similarly, FIG. 5 illustrates an alternative variable compressor inlet guide vane 253 that could be used in the turbine engine of FIGS. 1-3. The compressor inlet guide vane 253 includes an interior cavity 254 leading to a plurality of fluid outlets or nozzles 256 aligned along a trailing edge and directed transversely to the surface of the compressor inlet guide vane 253. Compressed air, such as bleed air from the axial compressor 22 or from the inlet to the combustor 30 (FIG. 1), is selectively supplied to each compressor inlet guide vane 253, 253', 253" independently as controlled by an associated valve actuator 255, 255', 255". In this case, the linkage between the actuator 255, 255', 255" and the variable inlet guide vane 253, 253', 253" is a conduit 258, 258', 258". The fluid flow through the nozzles 256 redirects the incoming airflow and reduces inlet distortion, thereby improving the stability of the axial compressor 22 and the turbine engine 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, there are many configurations of linkages, rigid and/or flexible, that could be used to connect the actuator 115 to the inlet guide vane flaps 18A. Also, although the actuator 115 has been shown in connection with a tip turbine engine 10, it could also be used in conventional or other turbine engines. Although the invention has been shown with a single actuator 115 for each inlet guide vane flap 18A, it is also possible that one actuator 115 could control more than one inlet guide vane flap 18A.

The invention claimed is:

1. A method for controlling a plurality of inlet guide vanes of a turbine engine, the method including the steps of:
   a) varying a first inlet guide vane of the plurality of inlet guide vanes to a first amount with a first actuator; and
   b) varying a second inlet guide vane of the plurality of inlet guide vanes to a second amount with a second actuator while the first inlet guide vane is at the first amount, the first amount being different from the second amount, wherein the first actuator and the second actuator each independently control only one inlet guide vane.

2. The method of claim 1 wherein said step a) further includes the step of pivoting the first inlet guide vane to a first angle relative to a longitudinal axis through the turbine engine, and said step b) further includes pivoting the second inlet guide vane to a second angle relative to the longitudinal axis while the first inlet guide vane is at the first angle, the first angle being different from the second angle.

3. The method of claim 2 further including the step of varying the first angle and the second angle independently of one another.

4. The method of claim 1 wherein the plurality of inlet guide vanes are located radially inward of a bypass air flow path.

5. The method of claim 1 wherein the plurality of inlet guide vanes are mounted in a bypass air flow path.

6. The method of claim 1 wherein the first inlet guide vane and the second inlet guide vane each include at least one fluid outlet, said step a) including the step of varying fluid flow through the at least one fluid outlet in the first inlet guide vane, said step b) including the step of varying fluid flow through the at least one fluid outlet in the second inlet guide vane.

7. The method of claim 1, wherein the first actuator controls only the first inlet guide vane.

8. The method of claim 1, wherein the second actuator controls only the second inlet guide vane.

* * * * *